United States Patent
Sasaoka

(10) Patent No.: US 9,884,347 B2
(45) Date of Patent: Feb. 6, 2018

(54) APPARATUS FOR MANUFACTURING A SERIES OF TAPED ELECTRONIC COMPONENTS, METHOD FOR MANUFACTURING A SERIES OF TAPED ELECTRONIC COMPONENTS, APPARATUS FOR CONVEYING ELECTRONIC COMPONENTS, METHOD FOR CONVEYING ELECTRONIC COMPONENTS, AND A SERIES OF TAPED ELECTRONIC COMPONENTS

(71) Applicant: Murata Manufacturing Co., Ltd., Nagaokakyo-shi, Kyoto-fu (JP)

(72) Inventor: Yoshikazu Sasaoka, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 223 days.

(21) Appl. No.: 14/587,040

(22) Filed: Dec. 31, 2014

(65) Prior Publication Data

US 2015/0196936 A1    Jul. 16, 2015

(30) Foreign Application Priority Data

Jan. 10, 2014   (JP) ................................ 2014-002842
Nov. 13, 2014  (JP) ................................ 2014-230731

(51) Int. Cl.
*B07C 5/36* (2006.01)
*H01G 4/30* (2006.01)
(Continued)

(52) U.S. Cl.
CPC .............. *B07C 5/362* (2013.01); *B07C 5/344* (2013.01); *B07C 5/3422* (2013.01); *H01G 4/012* (2013.01);
(Continued)

(58) Field of Classification Search
USPC ........................................................ 235/375
See application file for complete search history.

(56) References Cited

U.S. PATENT DOCUMENTS

| 2002/0050443 | A1* | 5/2002 | Kurabe | B65G 47/1485 |
| | | | | 198/803.5 |
| 2009/0207554 | A1 | 8/2009 | Iguchi et al. | |
| 2014/0181458 | A1* | 6/2014 | Loh | G06F 12/1027 |
| | | | | 711/206 |

FOREIGN PATENT DOCUMENTS

| CN | 1345177 A | 4/2002 |
| CN | 1762766 A | 4/2006 |

(Continued)

OTHER PUBLICATIONS

Official Communication issued in corresponding Chinese Patent Application No. 201510009940.1, dated May 27, 2016.
(Continued)

*Primary Examiner* — Michael G Lee
*Assistant Examiner* — David Tardif
(74) *Attorney, Agent, or Firm* — Keating & Bennett, LLP

(57) ABSTRACT

A controller identifies a stacking direction of internal electrodes in an electronic component, based on magnetic flux density detected by a magnetic flux density detector when the electronic component passes between a magnetic generator and the magnetic flux density detector. The controller instructs a sorter to sort out, based on the identified stacking direction of the internal electrodes, the electronic component in which the stacking direction of the internal electrodes is consistent with a predetermined direction. A conveying mechanism includes a conveying table with a plurality of concave portions, and conveys electronic component fixed in position in the concave portions.

20 Claims, 5 Drawing Sheets

(51) Int. Cl.
    *B07C 5/342*     (2006.01)
    *B07C 5/344*     (2006.01)
    *H01G 13/00*     (2013.01)
    *H01G 4/012*     (2006.01)
    *H01G 4/12*     (2006.01)

(52) U.S. Cl.
    CPC ............... *H01G 4/30* (2013.01); *H01G 13/00* (2013.01); *H01G 4/1227* (2013.01); *H01G 4/1245* (2013.01)

(56) References Cited

FOREIGN PATENT DOCUMENTS

| | | | |
|---|---|---|---|
| CN | 101515502 A | | 8/2009 |
| JP | 07-115033 A | | 5/1995 |
| JP | 7-115034 A | | 5/1995 |
| JP | H07115033 | * | 5/1995 |
| JP | 2002-68471 A | | 3/2002 |
| JP | 2003-341831 A | | 12/2003 |
| JP | 2008-174252 A | | 7/2008 |

OTHER PUBLICATIONS

Official Communication issued in corresponding Korean Patent Application No. 10-2015-0002781, dated Mar. 9, 2016.

* cited by examiner

APPARATUS FOR MANUFACTURING A SERIES OF TAPED ELECTRONIC COMPONENTS, METHOD FOR MANUFACTURING A SERIES OF TAPED ELECTRONIC COMPONENTS, APPARATUS FOR CONVEYING ELECTRONIC COMPONENTS, METHOD FOR CONVEYING ELECTRONIC COMPONENTS, AND A SERIES OF TAPED ELECTRONIC COMPONENTS

BACKGROUND OF THE INVENTION

1. Field of the Invention

The present invention relates to an apparatus for manufacturing a series of taped electronic components, a method for manufacturing a series of taped electronic components, an apparatus for conveying electronic components, a method for conveying electronic components, and a series of taped electronic components.

2. Description of the Related Art

Conventionally, a series of taped electronic components is known which has electronic components such as laminated capacitors housed in each concave portion of a carrier tape provided with a plurality of concave portions in the longitudinal direction (for example, JP 2008-174252 A).

In laminated capacitors, internal electrodes are stacked in one direction. Depending on whether the directions of mounting the laminated capacitors are configured as the stacking directions of the internal electrodes or as directions perpendicular to the stacking directions of the internal electrodes, electronic characteristics obtained may vary in some cases. For this reason, the series of taped electronic components is required to have the stacking directions of the internal electrodes aligned in the laminated capacitors housed in the plurality of concave portions. Therefore, it is preferable to detect the stacking directions of the internal electrodes in the laminated capacitors, and house, into the tape, the capacitors with the stacking directions of the internal electrodes aligned.

For example, JP 7-115033 A discloses a method of detecting the stacking direction of internal electrodes in a laminated capacitor by measuring a magnetic flux density that passes through the laminated capacitor.

However, the method disclosed in JP 7-115033 A has the problem of failing to detect, with a high degree of accuracy, the stacking direction of the internal electrodes in the laminated capacitor. In the laminated capacitor, downsizing is advancing, and dimensions of the internal electrodes are getting smaller. Thus, a magnetic force passing through the internal electrodes is only a small portion of all of the magnetic force of the entire magnet. A difference of magnetic force due to the difference in stacking direction of the internal electrodes of the laminated capacitor becomes smaller as downsizing of the laminated capacitor advances. Further, when the position of the laminated capacitor is misaligned, differences of magnetic force passing through the internal electrodes occur. Thus, it is hard to distinguish between magnetic force difference due to the difference of stacking direction and magnetic force difference due to the difference of positional misalignment of the laminated capacitor. Accordingly when the position of the laminated capacitor is not fixed, as in JP 7-115033 A, it is even harder to accurately detect the stacking direction of the internal electrodes. For this reason, for example, in the case of using the method disclosed in JP 7-115033 A, there is a problem that it is difficult to manufacture a series of taped electronic components in which the stacking directions of the internal electrodes are aligned with high certainty.

SUMMARY OF THE INVENTION

Preferred embodiments of the present invention align stacking directions of internal electrodes among a plurality of laminated capacitors in a taped electronic component series which includes the plurality of laminated capacitors housed therein.

An apparatus for manufacturing a series of taped electronic components according to a preferred embodiment of the present invention relates to an apparatus for manufacturing a series of taped electronic components, which includes a tape including a carrier tape provided with a plurality of holding holes in the longitudinal direction and a cover tape provided on the carrier tape to cover the plurality of holding holes; and electronic components placed in each of the holding holes, where each of the electronic components includes an electronic component body and a plurality of internal electrodes including a magnetic body, which are stacked in one direction in the electronic component body. The apparatus for manufacturing a series of taped electronic components according to a preferred embodiment of the present invention includes a conveying mechanism, a magnetic generator and a magnetic flux density detector, a sorter, and a controller. The conveying mechanism conveys a plurality of electronic components into the holding holes of the carrier tape. The magnetic generator and the magnetic flux density detector are arranged so that the electronic components conveyed by the conveying mechanism pass between the generator and the detector. The sorter sorts out the electronic components passing through the magnetic generator and the magnetic flux density detector. The controller identifies the stacking direction of the internal electrodes in the electronic component, based on the magnetic flux density detected by the magnetic flux density detector when the electronic component passes between the magnetic generator and the magnetic flux density detector. The controller instructs the sorter to sort out, based on the identified stacking direction of the internal electrodes, the electronic components in which the stacking direction of the internal electrodes is consistent with a predetermined direction. The conveying mechanism includes a conveying table including a plurality of concave portions, and conveys the electronic components fixed in predetermined position in the concave portions.

The conveying mechanism is preferably configured to fix the electronic components by suction.

The conveying table may preferably include a disk that rotates around a central axis. The peripheral surface of the conveying table may preferably include a plurality of concave portions provided mutually at intervals in a circumferential direction at the peripheral surface of the conveying table. The plurality of concave portions may have the shape of a rectangle in planar view, which extends toward the rotation center of the conveying table. The conveying table preferably includes suction holes provided to fix the electronic components at corners of the concave positions.

The suction holes are preferably configured so that the electronic components are fixed at back corners of the concave portions in the direction of rotating the conveying table.

The conveying table preferably includes a non-magnetic body.

The conveying table preferably is arranged over a conveying stage. The concave portions preferably are configured to penetrate the conveying table in the thickness direction and reach the conveying stage. The magnetic generator and the magnetic flux density detector preferably sandwich the conveying stage. The conveying stage preferably includes a non-magnetic body.

The apparatus for manufacturing a series of taped electronic components according to a preferred embodiment of the present invention preferably further includes an imaging device that images, from above, the electronic components which pass the magnetic generator and the magnetic flux density detector up to the sorter. In that case, the controller preferably instructs the sorter to sort out the electronic components without any defective appearances, based on images taken by the imaging device.

The electronic components may be capacitors, for example. In that case, the apparatus for manufacturing a series of taped electronic components according to a preferred embodiment of the present invention preferably further includes an electrostatic capacitance measurement device configured to measure the electrostatic capacitance of the electronic components up to the sorter. The controller preferably instructs the sorter to sort out the electronic components in which the electrostatic capacitance measured by the electrostatic capacitance measurement device falls within a predetermined range of electrostatic capacitance.

The controller is preferably configured or programmed to instruct the sorter to sort out the electronic components in which the stacking direction of the internal electrodes follows a vertical direction. The electronic components are preferably placed in the holding hole of the carrier tape so that the stacking direction of the internal electrodes follows the direction in which the holding holes of the carrier tape extend.

A method for manufacturing a series of taped electronic components according to another preferred embodiment of the present invention relates to a method for manufacturing a series of taped electronic components, which includes a tape including a carrier tape provided with a plurality of holding holes in the longitudinal direction and a cover tape provided on the carrier tape to cover the plurality of holding holes; and electronic components placed in each of the holding holes, where each of the electronic components includes an electronic component body and a plurality of internal electrodes including a magnetic body, which are stacked in one direction in the electronic component body. In the method for manufacturing a series of taped electronic components according to a preferred embodiment of the present invention, a conveying step of conveying a plurality of electronic components is carried out. The stacking direction of the internal electrodes in the electronic component is identified, based on the magnetic flux density detected by the magnetic flux density detector when the electronic component being conveyed by the conveying step passes between the magnetic generator and the magnetic flux density detector. The electronic components in which the stacking direction of the internal electrodes is consistent with a predetermined direction are sorted out based on the identified stacking direction of the internal electrodes. The electronic components sorted out are placed in the holding holes of the carrier tape. In the conveying step, the electronic components are conveyed with the electronic components fixed in predetermined position in a plurality of concave portions of a conveying table.

A series of taped electronic components according to a preferred embodiment of the present invention is manufactured by the method for manufacturing a series of taped electronic components according to another preferred embodiment of the present invention.

An apparatus for conveying electronic components according to a further preferred embodiment of the present invention relates to an apparatus for conveying electronic components each including an electronic component body and a plurality of internal electrodes including a magnetic body, which are stacked in a direction in the electronic component body. The apparatus for conveying electronic components according to the present preferred embodiment of the present invention includes a conveying mechanism, a magnetic generator and a magnetic flux density detector, a sorter, and a controller. The conveying mechanism conveys a plurality of electronic components. The magnetic generator and the magnetic flux density detector are arranged so that the electronic components conveyed by the conveying mechanism pass between the generator and the detector. The sorter sorts out the electronic components passing through the magnetic generator and the magnetic flux density detector. The controller identifies the stacking direction of the internal electrodes in the electronic component, based on the magnetic flux density detected by the magnetic flux density detector when the electronic component passes between the magnetic generator and the magnetic flux density detector. The controller instructs the sorter to sort out, based on the identified stacking direction of the internal electrodes, the electronic components in which the stacking direction of the internal electrodes is consistent with a predetermined direction. The conveying mechanism includes a conveying table including a plurality of concave portions, and conveys the electronic components fixed in predetermined position in the concave portions.

A method for conveying electronic components according to yet another preferred embodiment of the present invention relates to a method for conveying electronic components each including an electronic component body and a plurality of internal electrodes including a magnetic body, which are stacked in a direction in the electronic component body. In the method for conveying electronic components according to a preferred embodiment of the present invention, a conveying step of conveying a plurality of electronic components is carried out. The stacking direction of the internal electrodes in the electronic component is identified, based on the magnetic flux density detected by the magnetic flux density detector when the electronic component conveyed by the conveying step passes between the magnetic generator and the magnetic flux density detector. The electronic components in which the stacking direction of the internal electrodes is consistent with a predetermined direction are sorted out based on the identified stacking direction of the internal electrodes. In the conveying step, the electronic components are conveyed with the electronic components fixed in predetermined position in a plurality of concave portions of a conveying table.

According to various preferred embodiments of the present invention, the stacking directions of internal electrodes are aligned among a plurality of laminated capacitors in a taped electronic component series including the plurality of laminated capacitors housed therein.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
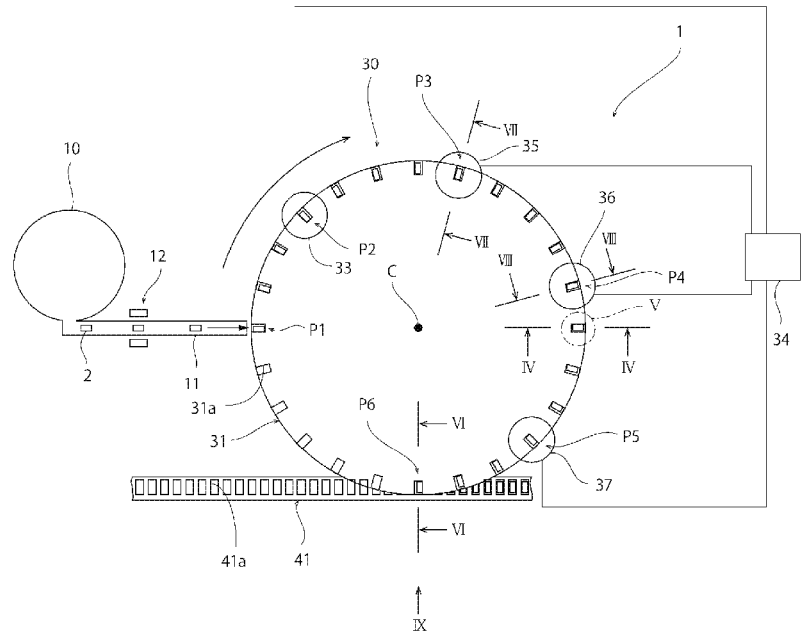
FIG. 1 is a schematic plan view of an apparatus for manufacturing a series of taped electronic components according to a preferred embodiment of the present invention.

As an example, preferred embodiments of the present invention will be described below. However, the following preferred embodiments are presented by way of example only. The present invention is not limited to the following preferred embodiments in any way.

In addition, members that have the same or substantially the same functions will be referred to by the same reference numerals in the respective drawings referred to in the preferred embodiments, etc. In addition, the drawings referred to in the preferred embodiments, etc. are schematically made. The ratios between dimensions of the objects drawn in the figures may differ from the ratios between the dimensions of real objects in some cases. The ratios between the dimensions of the objects may also differ between the drawings in some cases. The ratios between dimensions of specific objects should be determined in view of the following description.

FIG. 1 is a schematic plan view of an apparatus for manufacturing a series of taped electronic components according to the present preferred embodiment. As shown in FIG. 1, the apparatus 1 for manufacturing a series of taped electronic components includes a ball feeder 10. The ball feeder 10 includes a plurality of electronic components 2 housed therein. The ball feeder 10 vibrates to sequentially feed the electronic components to a linear feeder 11.

The linear feeder 11 conveys the electronic components 2 supplied by the vibration. The route of conveying the electronic components 2 by the linear feeder 11 is provided with a direction unifying mechanism 12. The direction unifying mechanism 12 is a mechanism that aligns the orientations of the electronic components 2 conveyed by the linear feeder 11. Specifically, the direction unifying mechanism 12 aligns the orientations of the electronic components 2 so that the stacking direction of internal electrodes of the electronic components 2 is oriented in a given direction. More specifically, in the present preferred embodiment, the direction unifying mechanism 12 aligns the orientations of the electronic components 2 so that the stacking direction of internal electrodes of the electronic components 2 is oriented in a vertical direction.

However, it is difficult for the direction unifying mechanism 12 to perfectly align the orientations of the electronic components 2. Accordingly, even when the direction unifying mechanism 12 is provided, electronic components in which the stacking direction of internal electrodes is not oriented in a desired direction may be conveyed by the linear feeder 11 in some cases.

The direction unifying mechanism 12 is not particularly limited, but may include a pair of magnets or the like.

Figure 2:
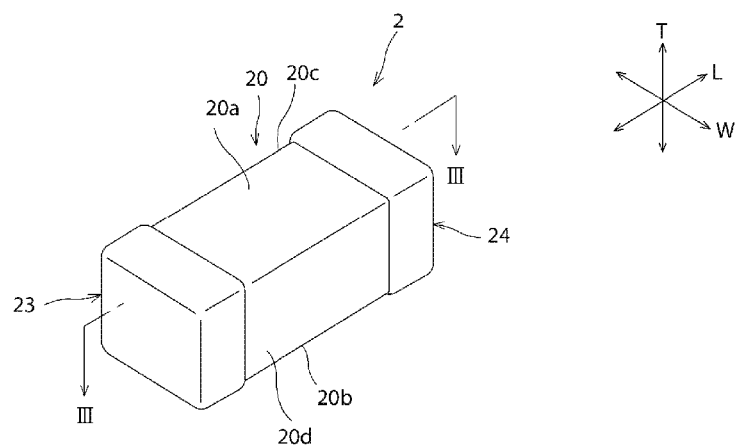
FIG. 2 is a schematic perspective view of an electronic component according to a preferred embodiment of the present invention.
Figure 3:
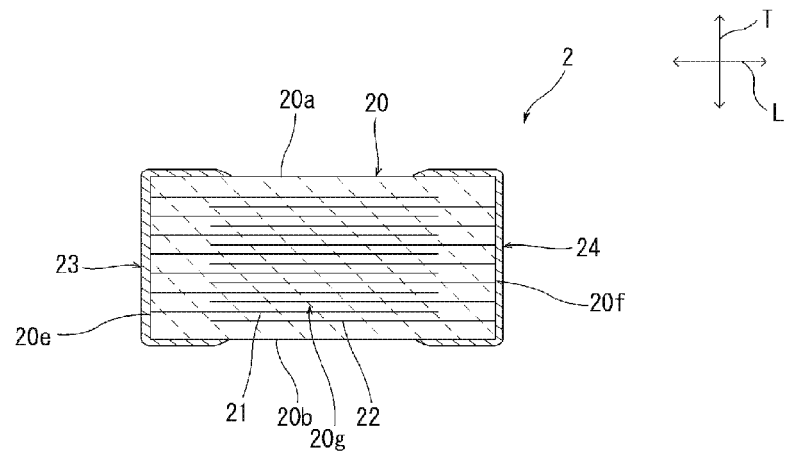
FIG. 3 is a schematic cross-sectional view of FIG. 2 along the line III-III.

FIG. 2 is a schematic perspective view of the electronic component 2. FIG. 3 is a schematic cross-sectional view of the electronic component 2.

As shown in FIGS. 2 and 3, the electronic component 2 includes an electronic component body 20. The electronic component body 20 has the shape of a cuboid, for example. The electronic component body 20 includes first and second principal surfaces $20a$ and $20b$, first and second side surfaces $20c$ and $20d$, and first and second end surfaces $20e$ and $20f$ (see FIG. 3). The first and second principal surfaces $20a$ and $20b$ each extend in the length direction L and the width direction W. The first and second side surfaces $20c$ and $20d$ each extend in the length direction L and the thickness direction T. The first and second end surfaces $20e$ and $20f$ each extend in the width direction W and the thickness direction T. The length direction L, the width direction W, and the thickness direction T are orthogonal to each other.

It is to be noted that the term "shape of a cuboid" is considered to encompass cuboids with corners or ridges rounded in preferred embodiments of the present invention. More precisely, the member in "the shape of a cuboid" means general members that have first and second principal surfaces, first and second side surfaces, and first and second end surfaces. Furthermore, the principal surfaces, the side surfaces, and the end surfaces, may partially or entirely include asperities.

The dimensions of the electronic component body 20 are not particularly limited. The length dimension of the electronic component body 20 is preferably about 0.4 mm to about 1.2 mm, for example. The width dimension of the electronic component body 20 is preferably about 0.2 mm to about 0.7 mm, for example. The thickness dimension of the electronic component body 20 is preferably about 0.2 mm to about 1.2 mm, for example. The ratio between the width dimension of the electronic component body 20 and the thickness dimension of the electronic component body 20 (the width dimension of the electronic component body 20: the thickness dimension of the electronic component body 20) is preferably 1:1 to 1:1.2, for example.

The electronic component body 20 is preferably made of an appropriate material depending on the function of the electronic component 2. The electronic component body 20 can be composed of, for example, a resin, a ceramic, etc. Specifically, when the electronic component 2 is a capacitor, the electronic component body 20 can be formed from a dielectric ceramic. Specific examples of the dielectric ceramic include, for example, $BaTiO_3$, $CaTiO_3$, $SrTiO_3$, and $CaZrO_3$. Depending on characteristics required for the electronic component 2, accessory constituents such as, for example, a Mn compound, a Mg compound, a Si compound, a Fe compound, a Cr compound, a Co compound, a Ni compound, and a rare-earth compound may be appropriately added to the electronic component body 20.

When the electronic component 2 is a piezoelectric component, the electronic component body can be formed from a piezoelectric ceramic. Specific examples of the piezoelectric ceramic include, for example, PZT (lead zirconate titanate) ceramics.

When the electronic component 2 is a thermistor, the electronic component body can be formed from a semiconductor ceramic. Specific examples of the semiconductor ceramic include, for example, spinel ceramics.

A non-limiting example of the electronic component 2 in the form of a laminated ceramic capacitor will be described below in the present preferred embodiment.

As shown in FIG. 3, a plurality of first internal electrodes 21 and a plurality of internal electrodes 22 are provided within the electronic component body 20.

The first and second internal electrodes 21 and 22 are provided alternately in the thickness direction T. The first internal electrodes 21 and second internal electrodes 22 which are adjacent to each other in the thickness direction T are opposed with a ceramic section 20g interposed therebetween. Accordingly, in the present preferred embodiment, the stacking direction of the internal electrodes 21 and 22 is equivalent to the thickness direction T.

The first internal electrodes 21 extend to the first end surface 20e. On the first end surface 20e, a first external electrode 23 is provided. The first internal electrodes 21 are connected to the first external electrode 23. In the present preferred embodiment, the first external electrode 23 extends from the first end surface 20e to the first and second principal surfaces 20a and 20b as well as the first and second side surfaces 20c and 20d.

The second internal electrodes 22 are extracted to the second end surface 20f. On the second end surface 20f, a second external electrode 24 is provided. The second internal electrodes 22 are connected to the second external electrode 24. In the present preferred embodiment, the second external electrode 24 extends from the second end surface 20f to the first and second principal surfaces 20a and 20b as well as the first and second side surfaces 20c and 20d.

The first and second internal electrodes 21 and 22 are preferably provided in a conductive magnetic body. The first and second internal electrodes 21 and 22 can be each made from, for example, Ni, Ag, Cu, or Pd.

The first and second external electrodes 23 and 24 can be made from an appropriate conductive material. The first and second external electrodes 23 and 24 can be each made from, for example, a metal selected from the group consisting of Ni, Cu, Ag, Pd, and Au, or an alloy containing one or more metals selected from the group consisting of Ni, Cu, Ag, Pd, and Au (for example, an Ag—Pd alloy).

As shown in FIG. 1, the linear feeder 11 supplies the electronic components 2 to a conveying mechanism 30. The conveying mechanism 30 conveys the electronic components 2 to a carrier tape 41.

The conveying mechanism 30 includes a disk-shaped conveying table 31 which rotates around a central axis C. Specifically, the conveying table 31 rotates around the central axis C in a clockwise direction in the present preferred embodiment.

Figure 4:
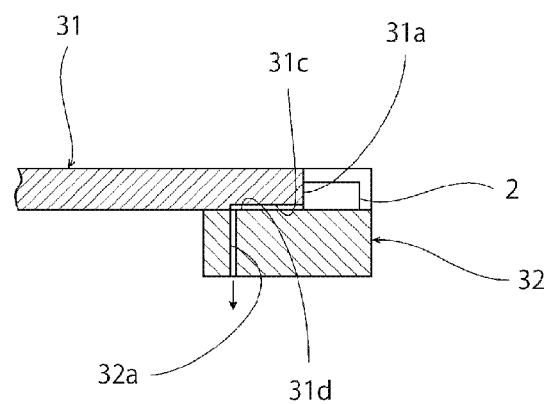
FIG. 4 is a schematic cross-sectional view of FIG. 1 along the line IV-IV.

The conveying table 31 is provided with a plurality of concave portions 31a. The plurality of concave portions 31a are each provided at the peripheral surface of the conveying table 31. The plurality of concave portions 31a are provided at intervals in a circumferential direction of the conveying table 31. Specifically, the plurality of concave portions 31a are provided at regular intervals in a circumferential direction of the conveying table 31 in the present preferred embodiment. The plurality of concave portions 31a each extend from the peripheral surface of the conveying table 31 toward the central axis C. As shown in FIG. 4, etc., the plurality of concave portions 31a are each provided across the conveying table 31 from one principal surface thereof to the other. More precisely, the plurality of concave portions 31a each penetrates through the conveying table in the thickness direction. The conveying table 31 is provided on a conveying stage 32 (see FIGS. 4 to 8). The concave portions 31a have lower sides blocked with the conveying stage 32.

Figure 5:
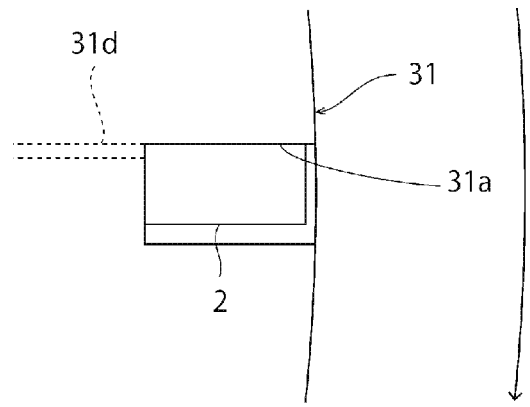
FIG. 5 is a schematic plan view of a V section in FIG. 1.

As shown in FIGS. 1 and 5, the plurality of concave portions 31a preferably have a rectangular or substantially rectangular shape in planar view. More particularly, the plurality of concave portions 31a preferably have a rectangular or substantially rectangular shape in planar view, which is slightly larger than the electronic components 2. The width of the concave portion 31a is preferably approximately 1.02 times to 1.2 times as large as the width of the electronic component 2, for example. The width of the concave portion 31a is preferably shorter than the length of the electronic component 2. The depth of the concave portion 31a is preferably, for example, about 1.02 times to about 1.2 times as large as the length of the electronic component 2.

Figure 6:
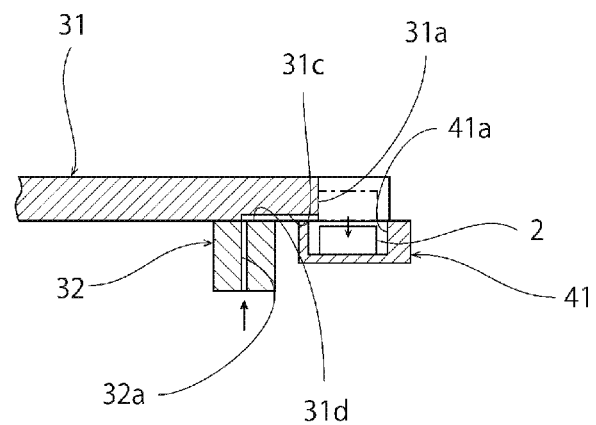
FIG. 6 is a schematic cross-sectional view of FIG. 1 along the line VI-VI.
Figure 9:
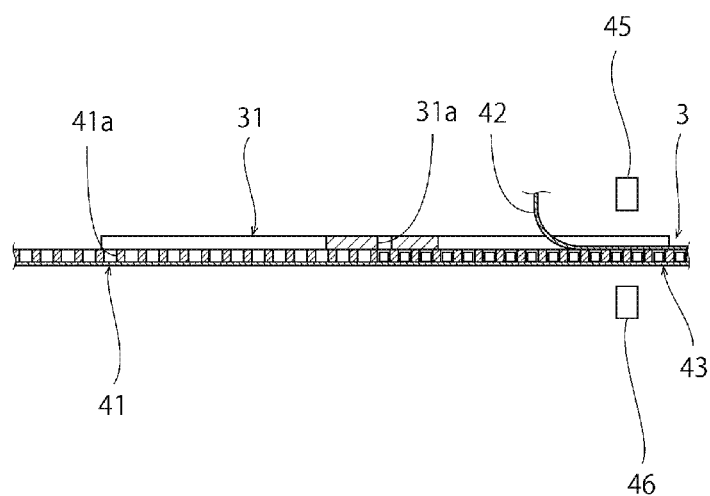
FIG. 9 is a partial schematic side view of the apparatus for manufacturing a series of taped electronic components viewed from an arrow IX of FIG. 1.

The electronic components 2 are transferred from the linear feeder 11 into the concave portions 31a of the conveying table 31 at a position P1. The electronic components 2 transferred into the concave portions 31a at the position P1 are conveyed in the circumferential direction around the central axis C by the rotation of the conveying table 31. The electronic components 2 are conveyed to a position P6. As shown in FIGS. 6 and 9, the electronic component 2 is housed into a holding hole 41a of the carrier tape 41 from the conveying table 31 at the position P6.

As shown in FIG. 4, the conveying table 31 preferably includes a linear groove 31c opening into the concave portion 31a in the present preferred embodiment. The linear groove 31c and the conveying stage 32 achieve the compartment formation of a suction hole 31d. This suction hole 31d is connected to a suction pump, not shown, via a through hole 32a. The electronic component 2 transferred into the concave portion 31a is fixed in position in the concave portion 31a through suction by the suction hole 31d. The electronic component 2 is conveyed under the condition fixed in position in the concave portion 31a. It is to be noted that the method for fixing the electronic components 2 is not limited to the suction. For example, the electronic components 2 may be fixed by methods other than the suction. More specifically, for example, the electronic components 2 may be fixed by electrostatic adsorption.

As shown in FIG. 5, the suction hole 31d is configured so that the electronic component 2 is fixed at a corner of the concave portion 31a. Specifically, the suction hole 31d is configured so as to open into the corner of the concave portion 31a. More particularly, the suction hole 31d is configured so that the electronic component 2 is fixed at the back corner of the concave portion 31a in the direction of rotating the conveying table 31 in the present preferred embodiment. The suction hole 31d is configured so as to open into the back corner of the concave portion 31a in the direction of rotating the conveying table 31.

As shown in FIG. 1, an electrostatic capacitance measurement device 33 is preferably located at a position P2 located on the conveying route from the position P1 to the position P6. This electrostatic capacitance measurement device measures therein the electrostatic capacitance of the electronic component 2 housed in the concave portion 31a. The measured electrostatic capacitance of the electronic component 2 is output to a controller 34. Even when the external electrodes and 24 include a magnetic body, areas of the external electrodes are smaller than those of the internal electrodes 21 and 22 when viewed in plan, and an influence due to magnetic force toward the external electrodes 23 and 24 is small.

Figure 7:
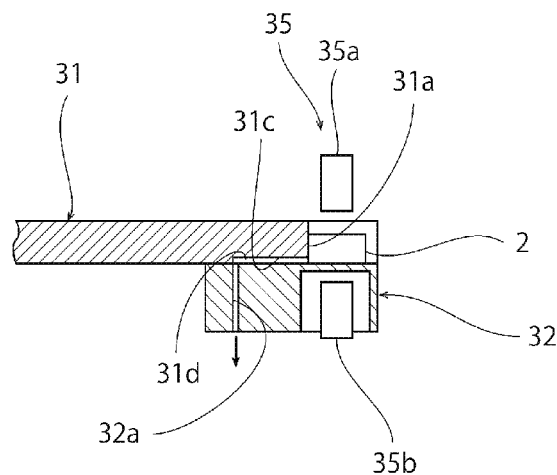
FIG. 7 is a schematic cross-sectional view of FIG. 1 along the line VII-VII.

On the conveying route, a direction discrimination device 35 is provided at a position P3 located between the position P2 and the position P6. The direction discrimination device 35 discriminates the stacking direction of the internal electrodes 21 and 22 in the electronic component 2. As shown in FIG. 7, the direction discrimination device 35 includes a magnetic generator 35a and a magnetic flux density detector 35b. The electronic component 2 conveyed by the conveying mechanism 30 passes between the magnetic generator 35a and the magnetic flux density detector 35b. The conveying table 31 and conveying stage 32 configured to convey the electronic component 2 are located between the magnetic generator 35a and the magnetic flux density detector 35b.

The density of magnetic fluxes from the magnetic generator 35a through the electronic component 2 to the magnetic flux density detector 35b differs between when the stacking direction of the internal electrodes 21 and 22 is perpendicular or substantially perpendicular to the array direction of the magnetic generator 35a and magnetic flux density detector 35b and when the stacking direction of the internal electrodes 21 and 22 is parallel or substantially parallel to the array direction of the magnetic generator 35a and magnetic flux density detector 35b. For this reason, the stacking direction of the internal electrodes 21 and 22 in the electronic component 2 is capable of being discriminated through the detection of the magnetic flux density by the magnetic flux density detector 35b when the electronic component 2 passes between the magnetic generator 35a and the magnetic flux density detector 35b. The magnetic flux density detector 35b outputs the detected magnetic flux density to the controller 34.

It is to be noted that the magnetic generator 35a may be a magnetic generator that requires electric power, such as coils, or a magnetic generator that requires no electric power, such as permanent magnets, e.g., neodymium magnets. The magnetic flux density detector 35b may preferably include, for example, a Hall element. The Hall element is preferably held by an aluminum plate, and covered by a zirconia cover, for example.

From the perspective of further ensuring the discrimination of the stacking direction of the internal electrodes 21 and 22 in the electronic component 2, the conveying table 31 is preferably composed of a non-magnetic body such as stainless steel, aluminum, plastic, and ceramic, for example. In addition, the conveying stage 32 is preferably composed of a non-magnetic body such as stainless steel, aluminum, plastic, and ceramic, for example. In particular, the conveying table 31 and the conveying stage 32 are each preferably composed of zirconia that is also excellent in abrasion resistance. This is because the density of magnetic fluxes passing through the electronic component 2 is capable of being measured with a higher degree of accuracy by the magnetic flux density detector 35b in these cases.

Figure 8:
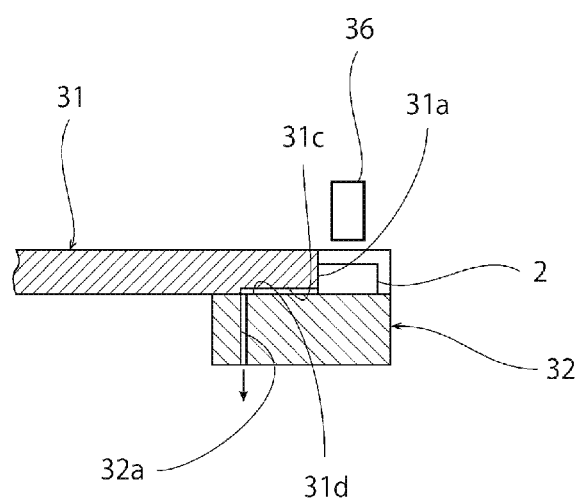
FIG. 8 is a schematic cross-sectional view of FIG. 1 along the line VIII-VIII.

As shown in FIG. 1, an imaging device 36 is provided at a position P4 located between the position P3 and the position P6 on the conveying route. As shown in FIG. 8, the imaging device 36 is located above the electronic component 2 conveyed by the conveying mechanism 30. The imaging device 36 takes an image of the electronic component 2 from above. The image taken is output to the controller 34 shown in FIG. 1.

On the conveying route, a sorter 37 is provided at a position P5 located between the position P4 and the position P6. The sorter 37 is connected to the controller 34. The sorter 37 sorts out the electronic components 2 based on an instruction from the controller 34.

Specifically, the controller 34 determines whether or not the electrostatic capacitance output from the electrostatic capacitance measurement device 33 falls within a predetermined range of electrostatic capacitance (standards of electrostatic capacitance).

The controller 34 identifies the stacking direction of the internal electrodes 21 and 22 in the electronic component 2 based on the magnetic flux density output from the magnetic flux density detector 35b. The controller 34 determines whether or not the identified stacking direction of the internal electrodes 21 and 22 is coincident with a predetermined direction. Specifically, in the present preferred embodiment, the controller 34 determines whether or not the identified stacking direction of the internal electrodes 21 and 22 is coincident with the vertical direction.

The controller 34 determines whether or not the electronic component 2 has any defective appearance based on the image output from the imaging device 36. Specifically, in the present preferred embodiment, the controller 34 determines the presence or absence of any defective appearance for the electronic components 2 determined as having the stacking direction of the internal electrodes 21 and 22 coincident with a predetermined direction. The controller 34 preferably is configured or programmed not to determine the presence or absence of any defective appearance for the electronic components 2 determined as having the stacking direction of the internal electrodes 21 and 22 not coincident with a predetermined direction.

The controller 34 makes the above-mentioned determinations to identify, as non-defective products, the electronic components 2 in which the electrostatic capacitance falls within a predetermined range of electrostatic capacitance, the stacking direction of the internal electrodes 21, 22 is coincident with a predetermined direction, and there is no defective appearance. The controller 34 identifies, as defective products, the electronic components 2 which fail to meet any of the three conditions mentioned above. Based on the result, the controller 34 instructs the sorter 37 to sort out the electronic components 2 identified as non-defective products, keeps the conveyance as it is, and instructs the sorter 37 to remove the electronic components 2 identified as defective products from the conveying table 31.

Specifically, in the present preferred embodiment, the sorter 37 preferably includes the suction hole 31d and a suction pump, not shown. When the electronic component 2 identified as a non-defective product reaches the position P5, the sorter 37 continues to fix the electronic component 2 by suction. On the other hand, when the electronic component 2 identified as a defective product reaches the position P5, the sorter 37 releases the fixation of the electronic component 2 by suction, and apply a positive pressure to the suction hole 31d. Thus, the electronic component 2 is eliminated from the concave portion 31a. Accordingly, the electronic components 2 conveyed through the position P5 to the position P6 are all regarded as electronic components identified as non-defective products.

As shown in FIG. 6, the conveying stage 32 is not provided under the conveying table 31 at the position P6. At the position P6, the carrier tape 41 is supplied under the conveying table 31. As shown in FIG. 9, the carrier tape 41 is provided with a plurality of holding holes 41a at intervals in the longitudinal direction. As shown in FIGS. 9 and 6, when the concave portion 31a is located at the position P6, the carrier tape 41 is positioned so that the holding hole 41a is located under the concave portion 31a. In the condition, the negative pressure on the suction hole 31d is released to push the electronic component 2 out with a push pin, thus resulting in the electronic component 2 housed in the holding hole 41a. It is to be noted that a positive pressure may be applied to the suction hole 31d when the electronic component 2 is housed. In addition, the electronic component 2 may be pulled by suction from the tape side, for example.

Thereafter, the carrier tape 41 is moved in the longitudinal direction, another holding hole 41a without any electronic component 2 housed therein is located under the concave portion 31a located at the position P6, and the electronic component 2 is transferred. These steps are carried out repeatedly to sequentially transfer the electronic component 2 into the plurality of holding holes 41a of the carrier tape 41.

Therefore, the electronic components 2 are housed into the holding holes 41a so that the stacking direction of the internal electrodes 21 and 22 follows the direction in which the holding holes 41a of the carrier tape 41 extend (depth direction).

Thereafter, as shown in FIG. 9, a cover tape 42 configured to cover the plurality of holding holes 41a is placed over the carrier tape 41. As a result, a series of taped electronic components 3 is manufactured which includes: a tape 43 including the carrier tape 41 and the cover tape 42; and the electronic components 2 housed in the holding holes 41a.

The series of taped electronic components 3 passes between the magnetic generator 45 and the magnetic flux density detector 46, and during the passage, the stacking direction of the internal electrodes 21 and 22 is confirmed in the electronic components 2 housed in the holding holes 41a.

In the series of taped electronic components 3 manufactured in the present preferred embodiment, the electronic components 2 are housed in the holding holes 41a so that the stacking direction of the internal electrodes 21 and 22 follows the direction in which the holding holes 41a of the carrier tape extend (depth direction). For this reason, the electronic components 2 are easily mounted onto, for example, a wiring substrate, etc. according to desired aspects, such as the stacking direction of the internal electrodes 21 and 22 perpendicular or parallel to the planar direction of the wiring substrate as a positional relationship, by peeling the cover tape 42 and mounting the electronic components held by suction.

As described above, in the present preferred embodiment, the electronic component 2 is conveyed under the condition fixed in position in the concave portion 31a. For this reason, at the position P3, the fluctuation is significantly reduced or prevented in the relative position of the electronic component 2 with respect to the magnetic generator 35a and the magnetic flux density detector 35b. Accordingly, it becomes possible to detect the stacking direction of the internal electrodes 21 and 22 in the electronic component 2 with more certainty.

From the perspective of further reducing the fluctuation in the relative position of the electronic component 2 with respect to the magnetic generator 35a and the magnetic flux density detector 35b at the position P3, the electronic component 2 is preferably fixed at a corner of the concave portion 31a, and more preferably, fixed at the back corner in the direction of rotating the conveying table 31. This is because the electronic component 2 is able to be fixed in position in a more stable fashion.

Furthermore, as described above, in the present preferred embodiment, the electronic component 2 is conveyed under the condition fixed in position in the concave portion 31a. For this reason, the measurement of the electrostatic capacitance of the electronic component 2 at the position P2 and the analysis of an image of the electronic component 2, which is taken at the position P4, is also achieved with a higher degree of accuracy.

Now, as for the electronic component 2, typically, the shapes of the first and second principal surfaces 20a and 20b and the degree of curvature of the first and second side surfaces 20c and 20d are different from each other under the influence of the internal electrodes 21 and 22. Specifically, the first and second principal surfaces 20a and 20b have a relatively small degree of curvature, whereas the first and second side surfaces 20c and 20d have a relatively large degree of curvature. For this reason, images in the case of imaging the electronic component 2 from above are slightly different between when the first or second principal surface 20a or 20b of the electronic component 2 is directed upward and when the first or second side surface 20c or 20d thereof is directed upward. Therefore, with fluctuations in the stacking direction of the internal electrodes and 22, it is difficult to check the appearances of the electronic components 2 with a high degree of accuracy.

In the present preferred embodiment herein, first, the stacking direction of the internal electrodes 21 and 22 in the electronic component 2 is discriminated at the position P3. Thereafter, based on the image taken at the position P4, the controllers 34 determines the presence or absence of any defective appearance for the electronic components 2 determined as having the stacking direction of the internal electrodes 21 and 22 coincident with a predetermined direction. For this reason, the appearance check is achieved with a high degree of accuracy. Accordingly, a series of taped electronic components 3 which is not likely to have the electronic components 2 with defective appearances is manufactured.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An apparatus for manufacturing a taped electronic component series including a tape assembly including a carrier tape provided with a plurality of holding holes and a cover tape provided on the carrier tape to cover the plurality of holding holes, and electronic components placed in each of the holding holes, wherein each of the electronic components includes an electronic component body, and a plurality of internal electrodes stacked in one direction in the electronic component body, the apparatus comprising:

a conveying mechanism configured to convey the plurality of electronic components into the holding holes of the carrier tape;

a magnetic generator and a magnetic flux density detector configured such that the electronic components conveyed by the conveying mechanism pass therebetween;

a sorter configured to sort out the electronic components passing between the magnetic generator and the magnetic flux density detector; and a controller configured or programmed to identify a stacking direction of the internal electrodes in the electronic component based on a magnetic flux density detected by the magnetic flux density detector when the electronic component passes between the magnetic generator and the magnetic flux density detector, and to instruct the sorter to sort out, based on the identified stacking direction of the internal electrodes, the electronic component in which the stacking direction of the internal electrodes is consistent with a predetermined direction; and the conveying mechanism includes a conveying table with a plurality of concave portions, and is configured to convey the electronic component fixed in a predetermined position in the concave portions.

2. The apparatus for manufacturing a taped electronic component series according to claim 1, wherein the conveying mechanism is configured to fix the electronic component by suction.

3. The apparatus for manufacturing a taped electronic component series according to claim 1, wherein the conveying table includes a disk configured to rotate around a central axis;

the plurality of concave portions is provided mutually at intervals in a circumferential direction at a peripheral surface of the conveying table;

the plurality of the concave portions each have a rectangular or substantially rectangular shape in planar view and extend toward a rotation center of the conveying table; and the conveying table includes a suction hole configured to fix the electronic component at a corner of the concave portion.

4. The apparatus for manufacturing a taped electronic component series according to claim 3, wherein the suction hole is configured so that the electronic component is fixed at a back corner of the concave portion in a direction of rotating the conveying table.

5. The apparatus for manufacturing a taped electronic component series according to claim 1, wherein the conveying table includes a non-magnetic body.

6. The apparatus for manufacturing a taped electronic component series according to claim 1, wherein the conveying table is placed over a conveying stage;

the concave portions are configured to penetrate the conveying table in a thickness direction and reach the conveying stage;

the magnetic generator and the magnetic flux density detector sandwich the conveying stage; and the conveying stage includes a non-magnetic body.

7. The apparatus for manufacturing a taped electronic component series according to claim 1, further comprising an imaging device configured to image, from above, the electronic component passing the magnetic generator and the magnetic flux density detector up to the sorter; wherein the controller is configured or programmed to instruct the sorter to sort out the electronic components without any defective appearances, based on images taken by the imaging device.

8. The apparatus for manufacturing a taped electronic component series according to claim 1, wherein the electronic components are capacitors;

the apparatus further comprises an electrostatic capacitance measurement device that measures electrostatic capacitance of the electronic components; and the controller is configured or programmed to instruct the sorter to sort out the electronic components in which the electrostatic capacitance measured by the electrostatic capacitance measurement device falls within a predetermined range of electrostatic capacitance.

9. The apparatus for manufacturing a taped electronic component series according to claim 1, wherein the controller is configured or programmed to instruct the sorter to sort out the electronic components in which the stacking direction of the internal electrodes follows a vertical direction; and the electronic components are placed in the holding holes of the carrier tape so that the stacking direction of the internal electrodes follows a direction in which the holding holes of the carrier tape extend.

10. A method for manufacturing a taped electronic component series including a tape including a carrier tape provided with a plurality of holding holes and a cover tape provided on the carrier tape to cover the plurality of holding holes, and electronic components placed in each of the holding holes, wherein each of the electronic components includes an electronic component body, and a plurality of internal electrodes stacked in one direction in the electronic component body, the method comprises:

conveying the plurality of electronic components;

identifying a stacking direction of the internal electrodes in the electronic component based on a magnetic flux density detected by a magnetic flux density detector when the electronic component being conveyed by the conveying step passes between a magnetic generator and the magnetic flux density detector;

sorting out, based on the identified stacking direction of the internal electrodes, the electronic component in which the stacking direction of the internal electrodes is consistent with a predetermined direction; and placing the electronic component sorted out into the holding holes of the carrier tape; wherein in the conveying step, the electronic components are conveyed with the electronic components fixed in predetermined position in the plurality of concave portions of the conveying table.

11. A series of taped electronic components manufactured by the method for manufacturing a taped electronic component series according to claim 10.

12. An apparatus for conveying electronic components including an electronic component body and a plurality of internal electrodes stacked in one direction in the electronic component body, the apparatus comprising:

a conveying mechanism configured to convey a plurality of electronic components;

a magnetic generator and a magnetic flux density detector arranged so that the electronic components conveyed by the conveying mechanism pass therebetween;

a sorter configured to sort out the electronic components passing between the magnetic generator and the magnetic flux density detector; and a controller configured or programmed to identify a stacking direction of the internal electrodes in the electronic component based on a magnetic flux density detected by the magnetic flux density detector when the electronic component passes between the magnetic generator and the magnetic flux density detector, and to instruct the sorter to sort out, based on the identified stacking direction of the internal electrodes, the electronic component in which the stacking direction of the internal electrodes is consistent with a predetermined direction; and the conveying mechanism includes a conveying table with a plurality of concave portions, and is configured to convey the electronic component fixed in a predetermined position in the concave portions.

13. The apparatus according to claim 12, wherein the conveying mechanism is configured to fix the electronic component by suction.

14. The apparatus according to claim 12, wherein
the conveying table includes a disk configured to rotate around a central axis;
the plurality of concave portions is provided mutually at intervals in a circumferential direction at a peripheral surface of the conveying table;
the plurality of the concave portions each have a rectangular or substantially rectangular shape in planar view and extend toward a rotation center of the conveying table; and
the conveying table includes a suction hole configured to fix the electronic component at a corner of the concave portion.

15. The apparatus to claim 14, wherein the suction hole is configured so that the electronic component is fixed at a back corner of the concave portion in a direction of rotating the conveying table.

16. The apparatus according to claim 12, wherein the conveying table includes a non-magnetic body.

17. The apparatus according to claim 12, wherein
the conveying table is placed over a conveying stage;
the concave portions are configured to penetrate the conveying table in a thickness direction and reach the conveying stage;
the magnetic generator and the magnetic flux density detector sandwich the conveying stage; and
the conveying stage includes a non-magnetic body.

18. The apparatus according to claim 12, further comprising an imaging device configured to image, from above, the electronic component passing the magnetic generator and the magnetic flux density detector up to the sorter; wherein
the controller is configured or programmed to instruct the sorter to sort out the electronic components without any defective appearances, based on images taken by the imaging device.

19. The apparatus according to claim 12, wherein
the electronic components are capacitors;
the apparatus further comprises an electrostatic capacitance measurement device that measures electrostatic capacitance of the electronic components; and
the controller is configured or programmed to instruct the sorter to sort out the electronic components in which the electrostatic capacitance measured by the electrostatic capacitance measurement device falls within a predetermined range of electrostatic capacitance.

20. A method for conveying electronic components including an electronic component body and a plurality of internal electrodes stacked in one direction in the electronic component body, wherein the method comprises:
conveying a plurality of electronic components;
identifying a stacking direction of the internal electrodes in each of the electronic components based on a magnetic flux density detected by a magnetic flux density detector when the electronic component conveyed by the conveying step passes between a magnetic generator and the magnetic flux density detector; and
sorting out, based on the identified stacking direction of the internal electrodes, the electronic component in which the stacking direction of the internal electrodes is consistent with a predetermined direction; and
in the conveying step, the electronic components are conveyed with the electronic components fixed in a predetermined position in a plurality of concave portions of a conveying table.

* * * * *